3,254,860
TAPE WINDER
Anthony F. Rodrigues, Los Gatos, Calif., assignor to
Cycle Equipment Company
Filed Sept. 19, 1963, Ser. No. 310,078
3 Claims. (Cl. 242—75.5)

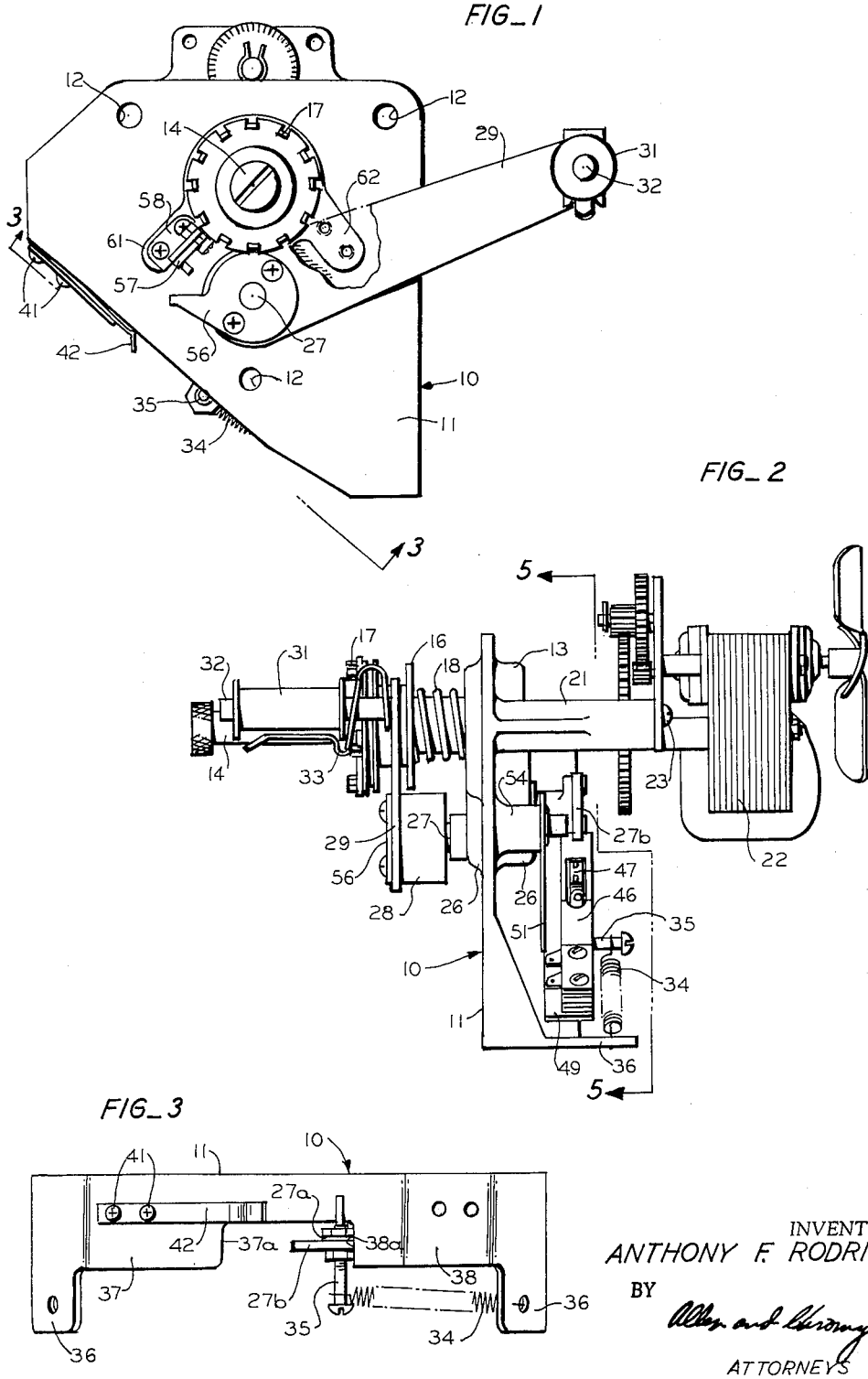

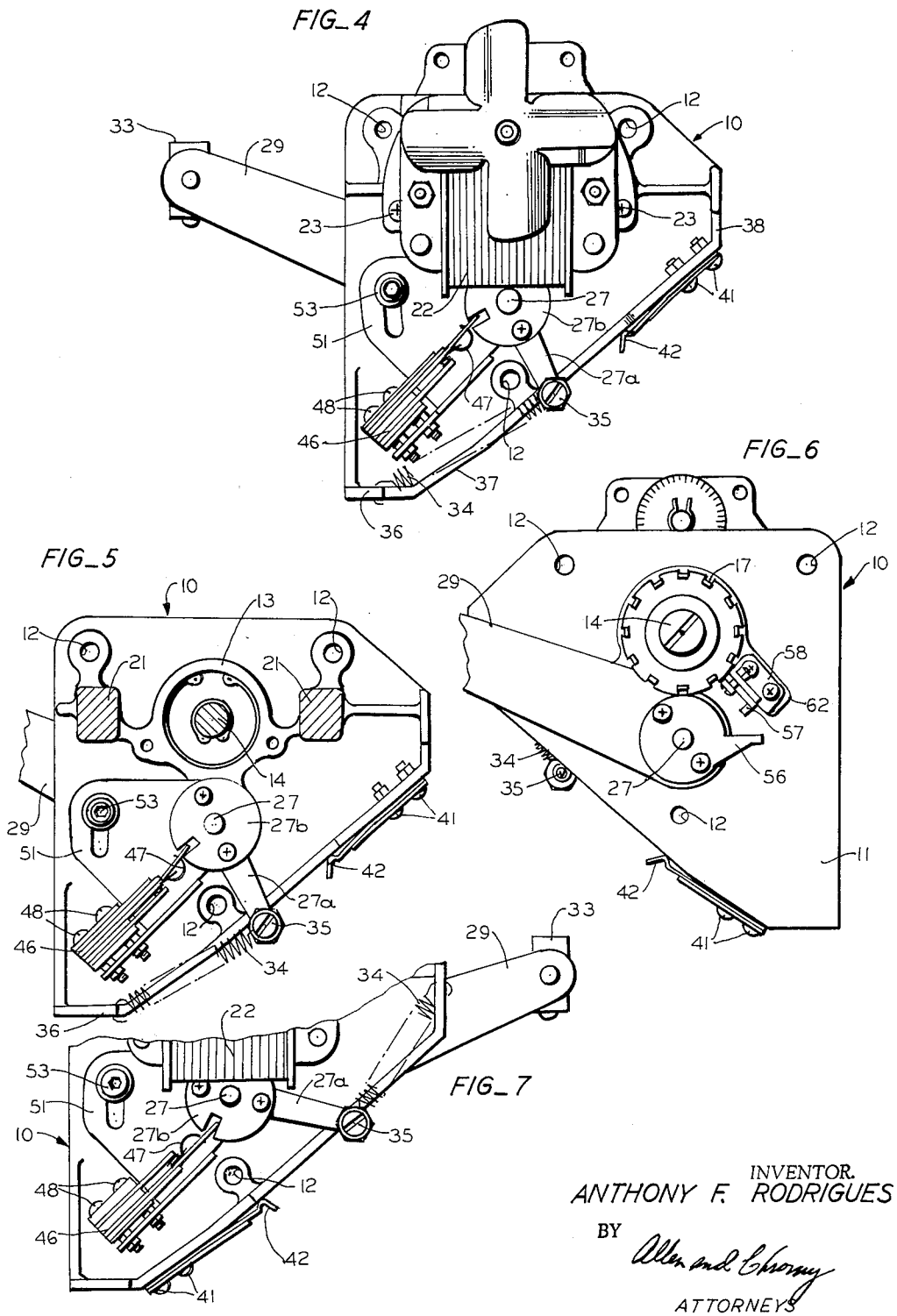

The present invention relates to tape winders or tape mechanisms and the like and is concerned more particularly with the provision of the self-contained power unit adapted to be used in either the feeding of tape or the winding of tape, this unit containing the motor, its control arm and its control switch.

It is a general object of the invention to provide a power unit having its various components mounted on a frame which is constructed for reversible positioning of various of the control elements to adapt it to universal use in the handling of tape.

It is another object of the invention to provide a self-contained power unit for tape winding and tape feeding mechanisms wherein the unit can be mounted in any desired position with reference to a panel, a box or other structure.

It is a further object of the invention to provide a power unit of the above character which has its components constructed to allow reverse positioning of the various parts for right hand or left hand mounting with respect to the adjacent machine with which it works and to be positioned above or below the machine, and conditioned to act as either feed unit or a winding unit.

Other objects and advantages of the invention will be apparent from the following description of a preferred embodiment thereof as illustrated in the attached drawings in which:

FIG. 1 is a front elevational view of the power unit;
FIG. 2 is a side elevational view as viewed from the right of FIG. 1;
FIG. 3 is a fragmentary elevational view of the apparatus of the unit taken as indicated by the line 3—3 in FIG. 1;
FIG. 4 is a rear elevational view of the unit;
FIG. 5 is a sectional view taken in planes indicated by the line 5—5 in FIG. 2;
FIG. 6 is an elevational view similar to FIG. 1 but illustrating an opposite position of the control arm;
FIG. 7 is a view similar to FIG. 4 but also illustrating an opposite position of certain of the control elements.

The power unit of the present invention includes a frame 10 (FIG. 1 and 2) which includes a planar wall 11 which is adapted for either abutting engagement or spaced mounting with reference to an apertured panel or other mounting surface, and this wall 11 has a plurality of apertures 12 providing mounting stations for securing the frame 10 in place. The frame 10 also includes a boss 13, to receive a bearing for a main shaft 14 upon which a suitable member to be driven can be mounted. This shaft 14 also carries a clutch member 16 having clutch teeth 17 and urged outwardly by a spring 18. The frame 10 also includes a pair of extension posts 21 (FIGS. 2 and 5) extending at a right angle to the wall 11 which provide means for mounting a motor 22 with its drive shaft in alignment with the drive shaft 14 for connection thereto. The extension posts 21 have threaded apertures to provide mounting stations for the fastening screws 23 of the motor.

The frame 10 (FIG. 2) also includes a boss 26 in which a pivot shaft 27 is pivotally mounted and at the front this pivot shaft carries a hub 28 of a motor control arm 29 carrying a roller 31 on a pin 32. A suitable spring retainer 33 for the roller is provided and carried by the pin 32.

The inner end of the shaft 27 (FIGS. 3 and 4) carries a stop arm 27a and a switch operating disc 27b. The arm 27a carries a pin 35 which is connected by a spring 34 with one of a pair of spring mounting stations 36 in similar opposed flanges 37 and 38 of the frame 10. Each of these flanges 37 and 38 has a pair of apertures to receive a pair of fastening screws 41 for a spring retainer 42 for the pin 35 so that the arm can be latched on the retainer 42 and the control arm 29 be latched in one extreme position. Similar fastening stations in both the flanges 37 and 38 provide for reversible mounting of the spring retainer 42 and reverse positioning of the spring 34. The edges 37a (FIG. 3) form stops for the stop arm 27a. The disc 27b, FIG. 4, is notched to receive the end of a set switch 46 so that the oscillation of this disc 27b will either adjust the switch to its "on" position or its "off" position and because of the toggle action of the U-shaped spring 47, the switch 46 will be retained in either position. This switch is mounted by a pair of screws 48 on adjustable switch bracket 51 which is apertured to pass over the shaft 27 in being mounted in place and is slotted to receive a locking screw 53 which is threaded into a boss 54 of the frame 10. By adjusting the bracket 51 about its pivot shaft 27 the time of opening and closing of the switch 46 can be varied.

FIGS. 1–5 illustrate the power unit with the control arm 29 extending to the right as viewed in FIG. 1 from the front of the unit, and spring urged upwardly to the position shown where the stop arm 27a is engaged with the stop surface 38a (FIG. 3). The reverse position of this control arm 29 is illustrated in FIG. 6, where the spring 34 is shown in the reversed position and also the latch 42 is on the flange 37 instead of the flange 38. FIG. 7 illustrates the reversed mounting of the motor switch 46 on its mounting plate 51 so that its action is to set the switch to its "off" position in the upper position of the arm 29 and to its "on" position in the lower position of this arm.

In order to operate the clutch, the control arm 29 (FIG. 1) carries a conventional form of operating finger 56, adapted to engage a conventional bellcrank 57 engaged with a flange of the clutch 16. The mounting bracket 58 for the bellcrank 57 is mounted on a pad 61, and a similar pad 62 is provided on the opposite side of the frame in symmetrical relation with the pad 61 when the arm 29 is moved to its opposite position as seen in FIG. 6.

From the above description, it will be apparent that the invention has provided a very flexible and adaptable power unit which operates on demand of the tape being fed or the tape being received and is in effect a slave unit which can be operated with reference to a machine at the left of the unit, at the right of the unit, or above or below the unit and can be operated either as a tape winder or as a tape feeder when the appropriate reel is mounted on its shaft 14.

While I have shown and described a preferred embodiment of the invention, it will be apparent that the invention is capable of variation and modification from the form shown so that the scope thereof should be limited only by the scope of the claims appended hereto.

What I claim is:
1. In a power unit for winding or feeding of perforated paper tape, a frame having a wall provided with a plurality of apertured mounting stations, a first boss in said wall, a drive shaft journaled in said first boss, a pair of extension posts on said wall for the mounting of a motor, a second boss in said wall, a motor control arm, a pivot shaft carrying said arm and pivotally mounted in said second boss, a pair of spaced apart flanges on said frame forming spaced-apart stops, a second arm on said pivot shaft and disposed between said stops, respective fastening stations in said spaced apart flanges, a spring connected to said second arm and to one of said fastening stations, said pivot shaft carrying a switch operating member, a switch bracket pivotally mounted on said frame, a switch on said bracket for controlling the motor and clamping means for said bracket carried by said wall and engaging a slot in said bracket whereby said switch can be adjusted with reference to the operating member therefor.

2. In a power unit for winding or feeding of perforated paper tape, a frame having a wall provided with a plurality of apertured mounting stations, a first boss in said wall, a drive shaft journaled in said first boss, a pair of extension posts on said wall for the mounting of a motor, a second boss in said wall, a motor control arm, a pivot shaft carrying said arm and pivotally mounted in said second boss, a pair of spaced apart stops on said frame, a second arm on said pivot shaft and disposed between said stops, a spring connected to said second arm and to said frame, said pivot shaft carrying a switch operating member, a switch bracket pivotally mounted on said pivot shaft, a switch on said bracket for controlling the motor and extending radially of said pivot shaft, and clamping means for said bracket carried by said wall and engaging a slot in said bracket whereby said switch can be adjusted with reference to the operating member therefor.

3. In a power unit for winding or feeding of perforated paper tape, a frame having a wall provided with a plurality of mounting stations, a first boss in said wall, a drive shaft journaled in said first boss, a mounting structure on said wall for the mounting of a motor, a second boss in said wall, a motor control arm, a pivot shaft carrying said arm and pivotally mounted in said second boss, a pair of spaced apart stops on said frame, respective fastening stations in said stops, a second arm on said pivot shaft and disposed between said stops, a spring connected to said second arm and to one of said fastening stations, said pivot shaft carrying switch operating means, a switch for controlling the motor and operable by said operating means, and switch mounting means adjustably mounted on said frame for varying the position of the switch with respect to said second arm and thereby shifting the timing of the "on" and "off" control of the motor.

References Cited by the Examiner
UNITED STATES PATENTS

| | | | |
|---|---|---|---|
| 2,700,513 | 1/1955 | Miles | 242—75.5 |
| 2,977,059 | 3/1961 | Mero | 242—71.8 X |
| 2,993,659 | 7/1961 | Johnson | 242—75.5 X |
| 3,045,941 | 7/1962 | Keesling | 242—75.5 X |

MERVIN STEIN, *Primary Examiner.*

STANLEY N. GILREATH, W. S. BURDEN,
*Assistant Examiners.*